US010812597B2

(12) United States Patent
Yang et al.

(10) Patent No.: US 10,812,597 B2
(45) Date of Patent: Oct. 20, 2020

(54) CONTENT DELIVERY NETWORK (CDN) MANAGEMENT SYSTEM, METHOD, AND APPARATUS

(71) Applicant: TENCENT TECHNOLOGY (SHENZHEN) COMPANY LIMITED, Shenzhen, Guangdong (CN)

(72) Inventors: Xiao Ying Yang, Guangdong (CN); Qi Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/353,150

(22) Filed: Mar. 14, 2019

(65) Prior Publication Data
US 2019/0208021 A1   Jul. 4, 2019

Related U.S. Application Data

(63) Continuation of application No. PCT/CN2017/114579, filed on Dec. 5, 2017.

(30) Foreign Application Priority Data

Dec. 19, 2016   (CN) .......................... 2016 1 1176727

(51) Int. Cl.
*G06F 15/173* (2006.01)
*H04L 29/08* (2006.01)
(Continued)

(52) U.S. Cl.
CPC .......... *H04L 67/125* (2013.01); *H04L 41/00* (2013.01); *H04L 61/2015* (2013.01); *H04L 67/32* (2013.01); *H04L 61/6068* (2013.01)

(58) Field of Classification Search
None
See application file for complete search history.

(56) References Cited

U.S. PATENT DOCUMENTS 6,553,413 B1 *   4/2003   Leighton ............. H04L 61/1511
                                                               709/219
2002/0083118 A1 *   6/2002   Sim ....................... H04L 47/125
                                                               718/105
(Continued)

FOREIGN PATENT DOCUMENTS

CN        101977248 A     2/2011
CN        102064966 A     5/2011
(Continued)

OTHER PUBLICATIONS

Communication dated Apr. 30, 2019 from the State Intellectual Property Office of the P.R.C. in application No. 201611176727.0 Partial English Translation.
(Continued)

*Primary Examiner* — Phuoc H Nguyen
(74) *Attorney, Agent, or Firm* — Sughrue Mion, PLLC

(57) ABSTRACT

A content delivery network (CDN) management system is provided. The CDN management system includes: a central controller; and at least one CDN node. Each of the at least one CDN node includes: a node controller connected to the central controller, at least one service server, and a switch connected to the node controller and each service server. The central controller is configured to receive a task invoking request, generate a management task according to the task invoking request, and send the management task to the node controller, the task invoking request indicating a request to perform remote management on one service server of the at least one service server of the CDN node, and the node controller is configured to receive the management task sent
(Continued)

by the central controller, and control the service server based on the management task.

20 Claims, 10 Drawing Sheets

(51) Int. Cl.
*H04L 29/12* (2006.01)
*H04L 12/24* (2006.01)

(56) References Cited

U.S. PATENT DOCUMENTS

| | | | | |
|---|---|---|---|---|
| 2004/0073596 | A1* | 4/2004 | Kloninger | H04L 29/06 709/200 |
| 2008/0092058 | A1* | 4/2008 | Afergan | H04L 67/303 715/745 |
| 2011/0107379 | A1* | 5/2011 | Lajoie | H04L 65/1023 370/389 |
| 2014/0068025 | A1 | 3/2014 | Liu et al. | |
| 2014/0172970 | A1* | 6/2014 | Newton | H04L 41/0893 709/204 |
| 2014/0325577 | A1* | 10/2014 | Garcia Mendoza | H04L 67/26 725/115 |
| 2014/0337472 | A1* | 11/2014 | Newton | H04L 67/32 709/217 |
| 2014/0344425 | A1* | 11/2014 | Varney | H04L 41/0813 709/221 |
| 2015/0055623 | A1* | 2/2015 | Li | H04W 40/04 370/331 |

FOREIGN PATENT DOCUMENTS

| | | | |
|---|---|---|---|
| CN | 102572530 | A | 7/2012 |
| CN | 103236949 | A | 8/2013 |
| CN | 103346909 | A | 10/2013 |
| CN | 103379097 | A | 10/2013 |
| CN | 104065520 | A | 9/2014 |
| CN | 105981400 | A | 9/2016 |

OTHER PUBLICATIONS

Written Opinion, dated Feb. 26, 2018 from the International Bureau in counterpart International application No. PCT/CN2017/114579.
International Search Report for PCT/CN2017/114579 dated Feb. 26, 2018 [PCT/ISA/210].
Communication dated Oct. 21, 2019, from the State Intellectual Property of the P.R.C in application No. 201611176727.0.
Communication dated Apr. 3, 2020, from the China National Intellectual Property Administration in Application No. 201611176727.0.

* cited by examiner

CONTENT DELIVERY NETWORK (CDN) MANAGEMENT SYSTEM, METHOD, AND APPARATUS

CROSS-REFERENCE TO RELATED APPLICATIONS

This application is a continuation of International Patent Application No. PCT/CN2017/114579 filed on Dec. 5, 2017, which claims priority from Chinese Patent Application No. 201611176727.0, entitled "CDN MANAGEMENT SYSTEM, METHOD, AND APPARATUS" filed in the Chinese Patent Office on Dec. 19, 2016, the disclosures of which are incorporated by reference herein in their entireties.

BACKGROUND

Field

Methods and apparatuses consistent with example embodiments relate to computer technologies, and in particular, to content delivery network (CDN) management.

Description of Related Art

A CDN relates to CDN nodes that are disposed in various locations on a network, so that a user can access an Internet service provided by a proximate CDN node. For example, the Internet service may be a video on demand service, a file downloading service, or the like.

A related CDN system includes a centrally located Internet data center (IDC) and multiple CDN nodes disposed on a network edge. The IDC stores full content data. Each CDN node stores some accelerated content data. In other words, the content data stored in the CDN node is a subset of the full content data. The network edge generally is a network location that is one hop away from a user, so that the user accesses by proximity the content data. During specific implementation, there may be hundreds or thousands of CDN nodes, and each node includes dozens of service servers.

The service servers in the CDN nodes are mainly managed by using on-site manual operations. For example, conventional management operations such as power-on, shut-down, restart, and re-installation of an operating system (OS) are implemented by using on-site manual operations. However, because there are many CDN nodes, and the CDN nodes are in different locations, for example, some CDN nodes are in Beijing, some CDN nodes are in Shenzhen, and some other CDN nodes are in the United States of America, the efficiency is very low when the CDN nodes are managed only by using on-site manual operations.

SUMMARY

According to an aspect of an example embodiment, there is provided a system, the system including: a central controller; and at least one CDN node. Each of the at least one CDN node includes at least one memory configured to store computer code and at least one processor configured to access the at least one memory and operate according to the computer code to implement: a node controller connected to the central controller, at least one service server, and a switch connected to the node controller and each service server. The central controller is configured to receive a task invoking request, generate a management task according to the task invoking request, and send the management task to the node controller, the task invoking request indicating a request to perform remote management on one service server of the at least one service server of the CDN node, and the node controller is configured to receive the management task sent by the central controller, and control the service server based on the management task.

According to other aspects of one or more example embodiments, there is also provided apparatuses, methods and non-transitory computer readable mediums consistent with the system above.

DETAILED DESCRIPTION

To make the objectives, technical solutions, and advantages clearer, the following further describes implementations in detail with reference to the accompanying drawings.

Figure 1A:
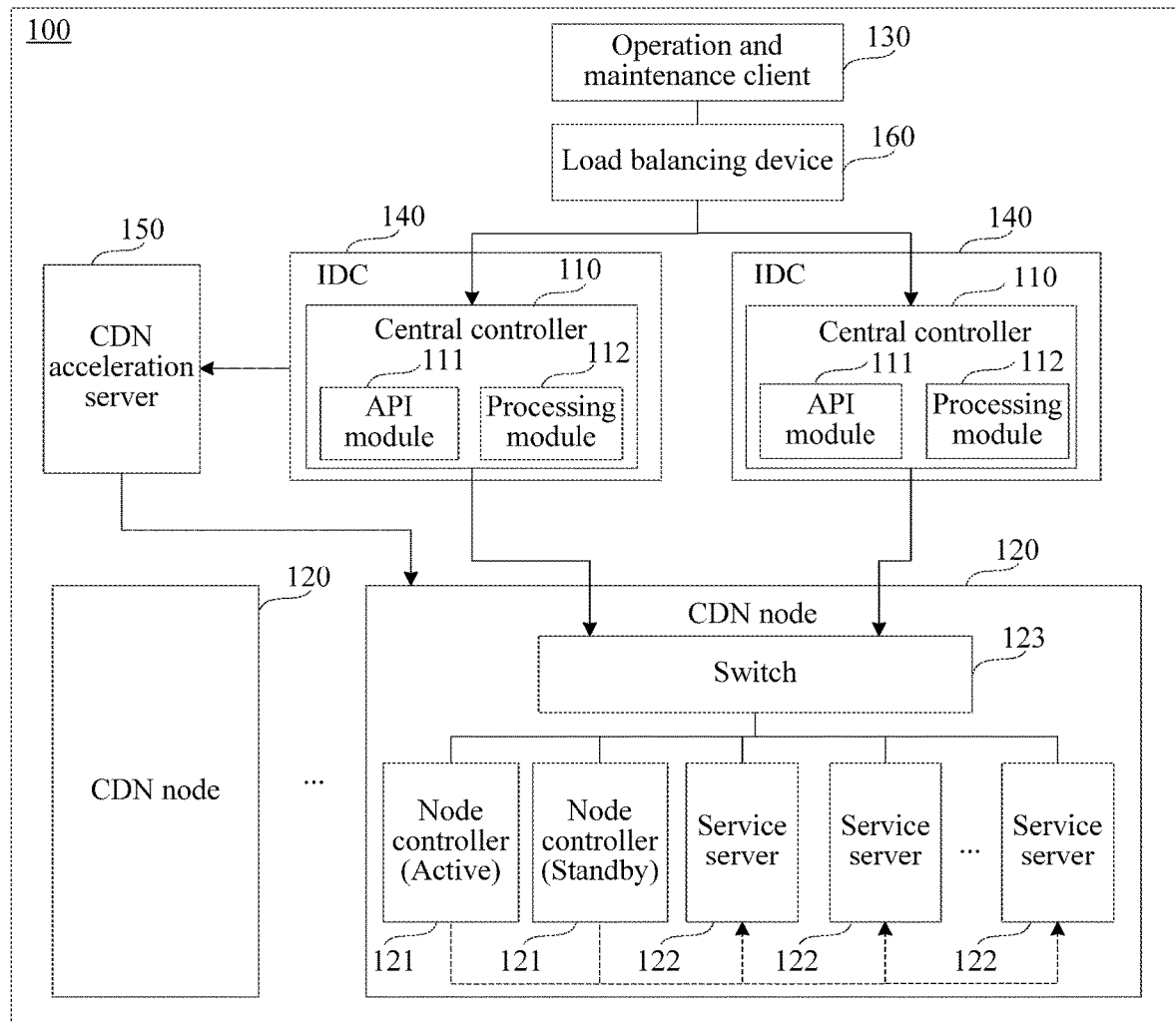
FIG. 1A is a schematic diagram of a CDN management system according to an example embodiment.

FIG. 1A is a schematic diagram of a CDN management system according to an example embodiment. As shown in FIG. 1A, the CDN management system 100 may include a central controller 110 and N CDN nodes 120, N being a positive integer.

The central controller 110 may include an API module 111 and a processing module 112. The API module 111 may provide an API interface used for remote management, and the processing module 112 has a capability of managing, controlling, and invoking a management task.

In an implementation, the CDN management system 100 may further include an operation and maintenance client 130. The operation and maintenance client 130 may be a foreground client used by an operation and maintenance person. The API module 111 may further be configured to receive a task invoking request sent by the operation and maintenance client 130, parse the received task invoking request, and forward the parsed task invoking request to the processing module 112.

The task invoking request may be sent by the operation and maintenance person to the API module 111 by using the operation and maintenance client 130, or may be generated by the central controller 110 by executing a script file.

In an implementation, the CDN management system 100 may further include an IDC 140, and the IDC 140 stores full service data, for example, online video data. The CDN nodes 120 store subsets of the service data stored in the IDC 140, for example, hot video data. In an implementation, the CDN management system 100 includes at least one IDC 140. The central controller 110 may be disposed on any IDC 140, or may be disposed on another device, or may be disposed as an independent device. This example embodiment does not limit a deployment location of the central controller 110.

In an implementation, there may be more than one central controller 110, and the central controllers 110 may be disposed in different locations.

In an implementation, the CDN management system 100 may further include a load balancing device 160. The load balancing device 160 may be configured to allocate the task invoking request to the central controllers 110. For example, when forwarding the task invoking request, if detecting that a central controller 110 is processing a task invoking request, the load balancing device 160 may forward the task invoking request to another central controller 110 in an idle state.

Each CDN node 120 may include a node controller 121, at least one service server 122, and a switch 123. The node controller 121 and the service server 122 both may be connected to the switch 123, and the node controller 121 may be logically connected to the central controller 110 by the switch 123.

The node controller 121 may be a background program running on a service server 122. The node controller 121 may be configured to manage each service server 122 belonging to the CDN node 120. For example, one CDN node 120 may include 50 service servers 122, and the node controller 121 may be installed on one service server 122. The service server 122 on which the node controller 121 is installed can manage the remaining 49 service servers 122.

Also, in addition to a capability of managing the service servers 122, the service server 122 on which the node controller 121 is installed may further have a service execution capability.

In an implementation, to ensure stability of the CDN management system 100, active and standby node controllers 121 may be disposed on each CDN node 120. When the active node controller 121 works normally, the standby node controller 121 does not need to work. When the active node controller 121 cannot work normally, the active node controller 121 is switched to the standby node controller 121, and the standby node controller 121 provides a service for the CDN node 120.

In an implementation, the central controller 110 and the node controller 121 use networks of different operators. When the central controller 110 transmits a file to the node controller 121, a file transmission speed may be slow due to cross-operator network communication. In this regard, the CDN management system 100 may further include a CDN acceleration server 150. The CDN acceleration server 150 may be configured to provide a CDN acceleration service for cross-operator network file transmission between the central controller 110 and the node controller 121.

Usually, to avoid service network congestion caused because there are excessively many services on a service network, the CDN management system 100 may execute management tasks such as power-on, shut-down, restart, entering a PXE, PING detection, and SSH detection for the service server 122 by using an outband network, and the CDN management system 100 may execute management tasks such as OS installation, codeword modification, and OS customization for the service server 122 by using a service network. The outband network may be a dedicated network channel independent of the service network, and corresponding to the outband network, the service network may also be referred to as an inband network. The CDN management system 100 transmits the management tasks of power-on, shut-down, restart, and entering the PXE of the service server 122 by using the outband network, so that a service on the inband network may not be affected.

Figure 1B:
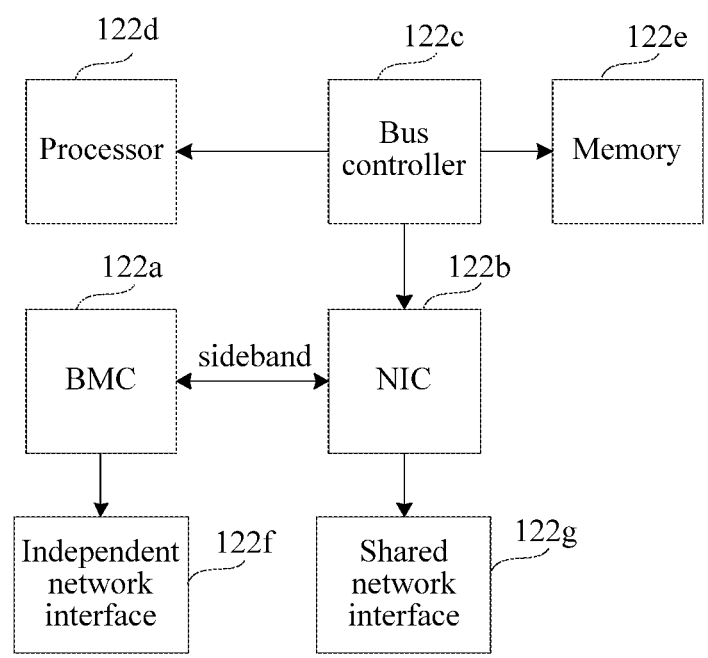
FIG. 1B is a schematic architectural diagram of a service server according to an example embodiment.

FIG. 1B is a schematic architectural diagram of the service server 122. As shown in FIG. 1B, architecture of the service server 122 may include a baseboard management controller (BMC) 122a, a network interface card (NIC) 122b, a bus controller 122c, a processor 122d, and a memory 122e.

The BMC 122a may be a single-chip microcomputer, and can provide an outband management function for the service server 122. The BMC 122a has an independent network interface 122f, configured to connect to an outband network. The NIC 122b has a shared network interface 122g, configured to connect to a service network. Because the outband network and the service network are independent of each other, when different network interfaces are used, an outband switch is used for establishing the outband network. As a result, a quantity of switches 123 is increased, and costs and network complexity are increased. To reduce the costs and the network complexity, the service server 122 may start a sideband mode, so that the BMC 122a can use the shared network interface 122g of the NIC 122b, the outband network and the service network can share one network interface, and the outband network and the service network can be multiplexed physically.

When the service server 122 starts the sideband mode, the service server 122 and the switch 123 are preset manually. A specific presetting operation may include:

1. The service server 122 is preset.

(1). A technician modifies an intelligent platform management interface (IPMI) access manner to share (a shared mode) by using a basic input/output system (BIOS) or on a web management interface of the BMC. After the IPMI access manner is set to share, the BMC 122a and the NIC 122b may share the shared network interface 12g.

(2). The technician allocates a VLAN label and an IP address to the shared network interface 122g, so that data sent through the shared network interface 122g can be separated from the service network.

(3) The technician configures a label, VLAN 100, for the BMC 122a. After the label, VLAN 100, is configured for the BMC 122a, the service server 122 can send data carrying the label, VLAN 100, and the label, VLAN 100, may be used to indicate that the data is transmitted by using the outband network.

For an OS deployment management task to be transmitted by using the service network, the technician may configure a label, VLAN 10, to distinguish between the management task and another task that is transmitted on the service network.

2. The switch 123 connected to the service server 122 is preset.

(1). The switch 123 starts the 802.1q (VLAN) protocol, and configures a VLAN label the same as that of the shared network interface 122g.

(2). The switch 123 configures an OS deployment (the label is VLAN 10) DHCP relay transmitted by using the outband (the label is VLAN 100) network. The DHCP relay may be configured to direct to the node controller 121 of the CDN node 120 in which the service server 122 is located, to forward, to the node controller 121, a DHCP request sent by the service server 122.

(3). A port of the switch 123 is configured as a trunk mode, and in the trunk mode, the switch 123 allows passing-through of data of multiple VLANs, and allows communication between the VLAN 10 and the VLAN 100.

When establishment of the CDN management system 100 shown in FIG. 1A is completed, the CDN management system 100 may perform remote management on the service server 122 of the CDN node 120 by using the central controller 110 and the node controller 121 and according to the task invoking request sent by the operation and maintenance client 130. For a specific implementation, refer to the steps illustrated in FIG. 2 and discussed below.

Figure 2:
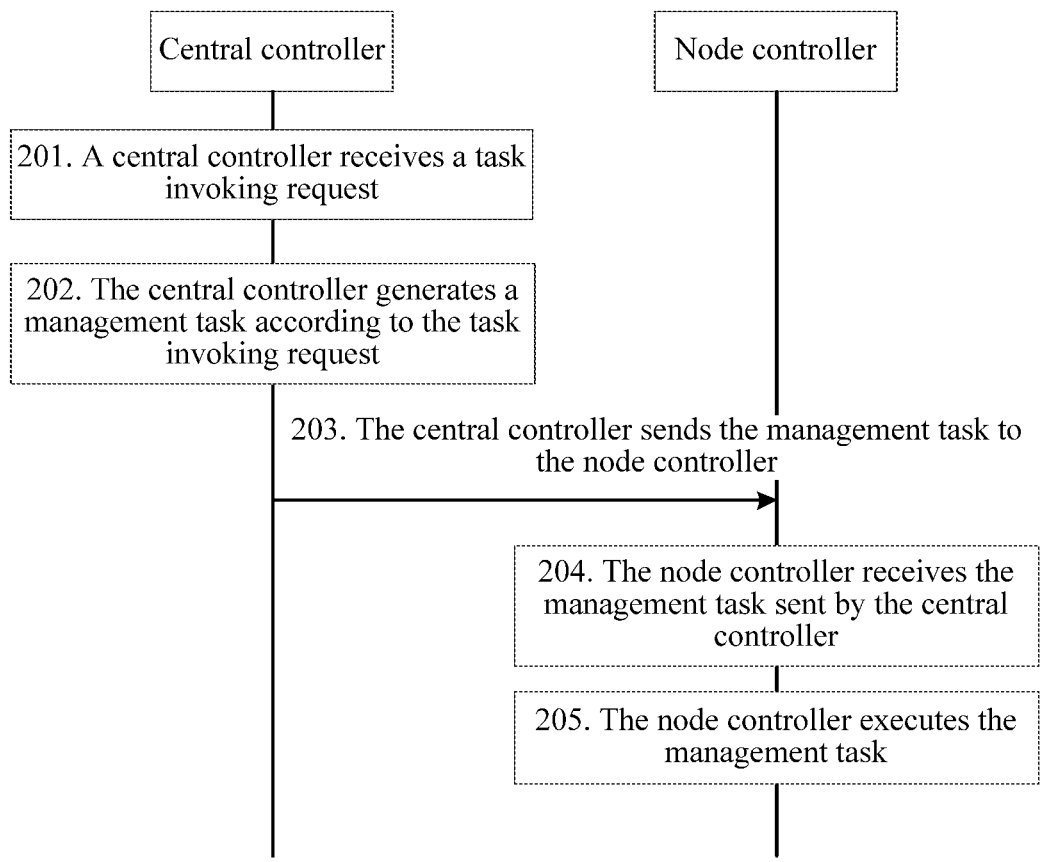
FIG. 2 is a method flowchart of a CDN management method according to an example embodiment.

FIG. 2 is a method flowchart of a CDN management method according to an example embodiment. The CDN management method may be applied to the CDN management system 100 shown in FIG. 1A. As shown in FIG. 2, the CDN management method may include the following steps.

Step 201. A central controller receives a task invoking request.

The task invoking request may request remote management on a service server of a CDN node, and the CDN node may include a node controller and at least one service server. The remote management may mean that the service server of the CDN node may be controlled by a remote end to perform an operation such as power-on, shut-down, and OS deployment.

In an implementation, the task invoking request may be sent by an operation and maintenance person by using an operation and maintenance client, or may be generated by the central controller by executing a script file.

In an implementation, the task invoking request may include at least an identifier of the CDN node and an identifier of the service server. The identifier of the CDN node may be used to identify a CDN node in which a node controller to be controlled by a central controller is located. The identifier of the service server may be used to indicate a service server on which remote management is to be performed. For example, the identifier of the service server may include a sequence number of the service server.

Step 202. The central controller generates a management task according to the task invoking request.

The central controller may search for a corresponding node controller, a task instruction, and a management IP address of the service server according to the task invoking request. The central controller may search for parameters such as a type of the management task, and a default user name and codeword. Then, the central controller may package the task instruction, the management IP address of the service server, the type of the management task, and the default user name and codeword into the management task.

Step 203. The central controller sends the management task to the node controller.

The central controller may send, according to the node controller corresponding to the task invoking request and found by the central controller, the packaged management task to the node controller corresponding to the task invoking request.

Step 204. The node controller receives the management task sent by the central controller.

After receiving the management task sent by the central controller, the node controller may parse the management task to obtain the task instruction and the parameters related to the management task in the management task, for example, the management IP address of the service server.

Step 205. The node controller executes the management task.

The node controller may execute the management task according to the task instruction and the parameters related to the management task that are obtained through parsing.

It may be understood that when some management tasks are executed, the node controller may transmit an image file or a script file to a service server corresponding to a task invoking request, and then, may send an execution instruction to the service server, so that the service server may execute the received image file or script file. For example, the management task executed by the node controller may be an OS installation task.

In summary, in the CDN management method consistent with example embodiments, the central controller may first receive the task invoking request. The task invoking request may be used to request to perform the remote management on the service server of the CDN node. Then, the central controller may generate the management task according to the task invoking request, and send the management task to the node controller. Subsequently, after receiving the management task, the node controller may execute the management task. As can be learned, in this example embodiment, because when a service server is managed, a central controller performs remote management on the service server by using a task invoking request, and the management does not need an on-site manual operation, the efficiency of managing many CDN nodes in disperse locations is improved.

For the convenience of uniform management of a central controller, a node controller may assign an outband management IP address and a deployment management IP address to a service server, and report the assigned outband management IP address and deployment management IP address to the central controller, so that the central controller can store and manage the outband management IP address and the deployment management IP address. For details, refer to steps shown in FIG. 3A.

Figure 3A:
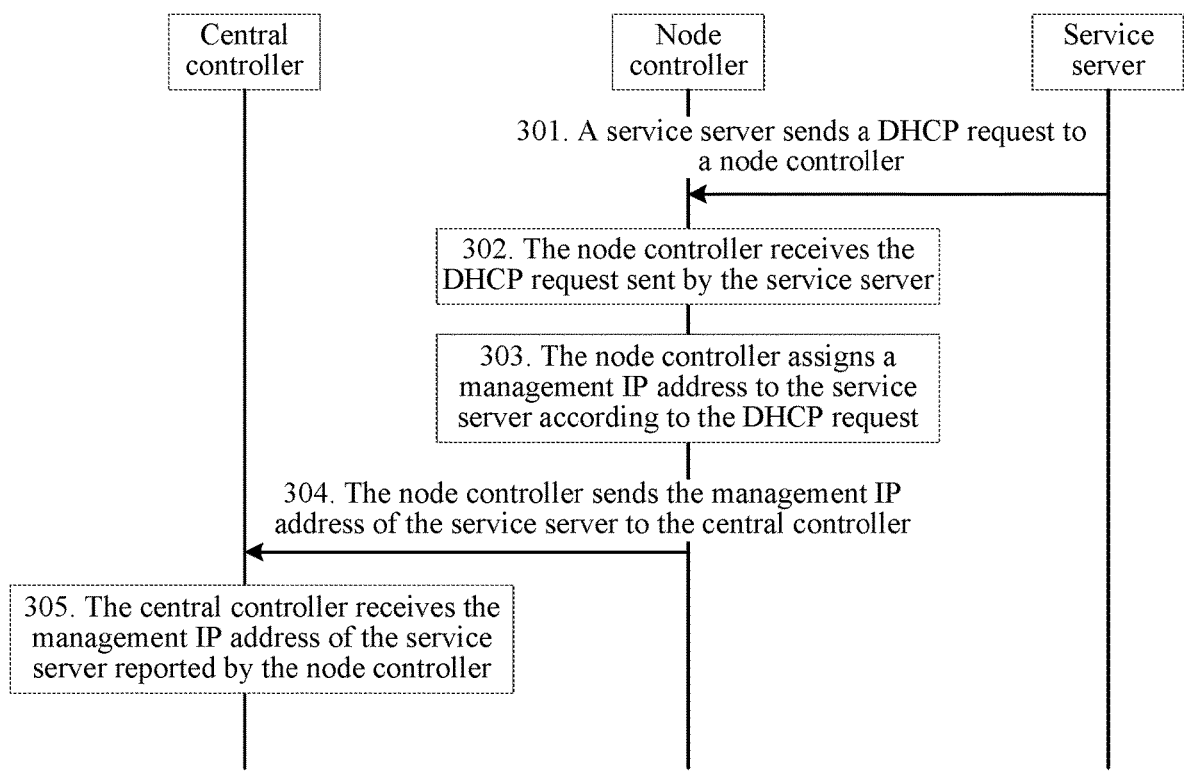
FIG. 3A is a method flowchart of a CDN management method according to another example embodiment.

FIG. 3A is a method flowchart of a CDN management method according to another example embodiment. The CDN management method is described by using an example in which the method is applied to the CDN management system 100 shown in FIG. 1A. As shown in FIG. 3A, the CDN management method may include the following steps.

Step 301. A service server sends a DHCP request to a node controller.

An OS deployment DHCP relay transmitted by using an outband network is preconfigured on a switch connected to the service server, and the DHCP relay is configured to direct to a node controller of a CDN node in which the service server is located, and is configured to forward, to the node controller, a DHCP request sent by the service server.

After the service server is powered on, the service server automatically sends the DHCP request, and after being processed by the DHCP relay mechanism of the switch, the DHCP request may be forwarded to the node controller of the CDN node in which the service server is located.

The DHCP request sent by the service server may include an identifier of the service server, for example, a sequence number of the service server.

Step 302. The node controller receives the DHCP request sent by the service server.

The DHCP request includes the identifier of the service server, for example, the sequence number of the service server.

Step 303. The node controller assigns a management IP address to the service server according to the DHCP request.

In this example embodiment, the management IP address is different from an IP address of the service server when the service server provides a service. As a DHCP server, the node controller may assign an outband management IP address, or may assign a deployment management IP address.

In an implementation, step 303 may include the following steps:

S1. The node controller assigns the outband management IP address to the service server from a first IP network segment corresponding to a first VLAN.

The first IP network segment is an outband dedicated IP network segment, for example, 192.168.0.0/24. The assigned outband management IP address may be 192.168.0.5/24.

The outband management IP address may be an IP address used to execute a first-category task instruction. The first-category task instruction may include at least one of a power-on instruction, a shut-down instruction, a restart instruction, an instruction of entering a PXE, a PING detection instruction, and an SSH detection instruction.

S2. The node controller assigns the deployment management IP address to the service server from a second IP network segment corresponding to a second VLAN.

The second IP network segment is a deployment dedicated IP network segment, for example, 192.168.1.0/24. The assigned deployment management IP address may be 192.168.1.4/24.

The deployment management IP address may be an IP address used to execute a second-category task instruction. The second-category task instruction may include at least one of an OS installation instruction, a codeword modification instruction of the OS, and an OS customization instruction.

Step 304. The node controller sends the management IP address of the service server to the central controller.

In this example embodiment, when the management IP address is the outband management IP address, the node controller may send the outband management IP address to the central controller. A sending format of the outband management IP address may be any one of the following: a format of the identifier of the service server+the outband management IP address of the service server, a format of an identifier of the CDN node+the identifier of the service server+the outband management IP address of the service server, or a format of an identifier of the node controller+the identifier of the service server+the outband management IP address of the service server.

When the management IP address is the deployment management IP address, because the node controller actively reports information about the service server in an OS deployment process, the node controller may not add the identifier of the service server to the deployment management IP address when sending the deployment management IP address to the central controller. The sending format of the deployment management IP address may be: a format of the identifier of the CDN node+the deployment management IP address of the service server, or a format of the identifier of the node controller+the deployment management IP address of the service server.

Step 305. The central controller receives the management IP address of the service server reported by the node controller.

After receiving the management IP address of the service server reported by the node controller, the central controller may store the management IP address of the service server.

In this example embodiment, when the management IP address reported by the node controller is the outband management IP address, the central controller stores a correspondence between the outband management IP address and the identifier of the service server; and when the management IP address reported by the node controller is the deployment management IP address, the central controller may store the deployment management IP address of the service server, and does not necessarily store the identifier of the service server.

In an actual application, to update in time the management IP address stored in the central controller, the node controller periodically reports the management IP address of the service server to the central controller, for example, once a day, so that the central controller stores and manages the management IP address.

It should be noted that the central controller in step 304 and step 305 may be a processing module of the central controller.

A management task that a task invoking requests to execute may include a first management task and a second management task. The first management task may include a first-category task instruction and an outband management IP address, and the second management task may include a second-category task instruction and a deployment management IP address. When the management task is the first management task, refer to steps shown in FIG. 3B, and when the management task is the second management task, refer to steps shown in FIG. 3C.

Figure 3B:
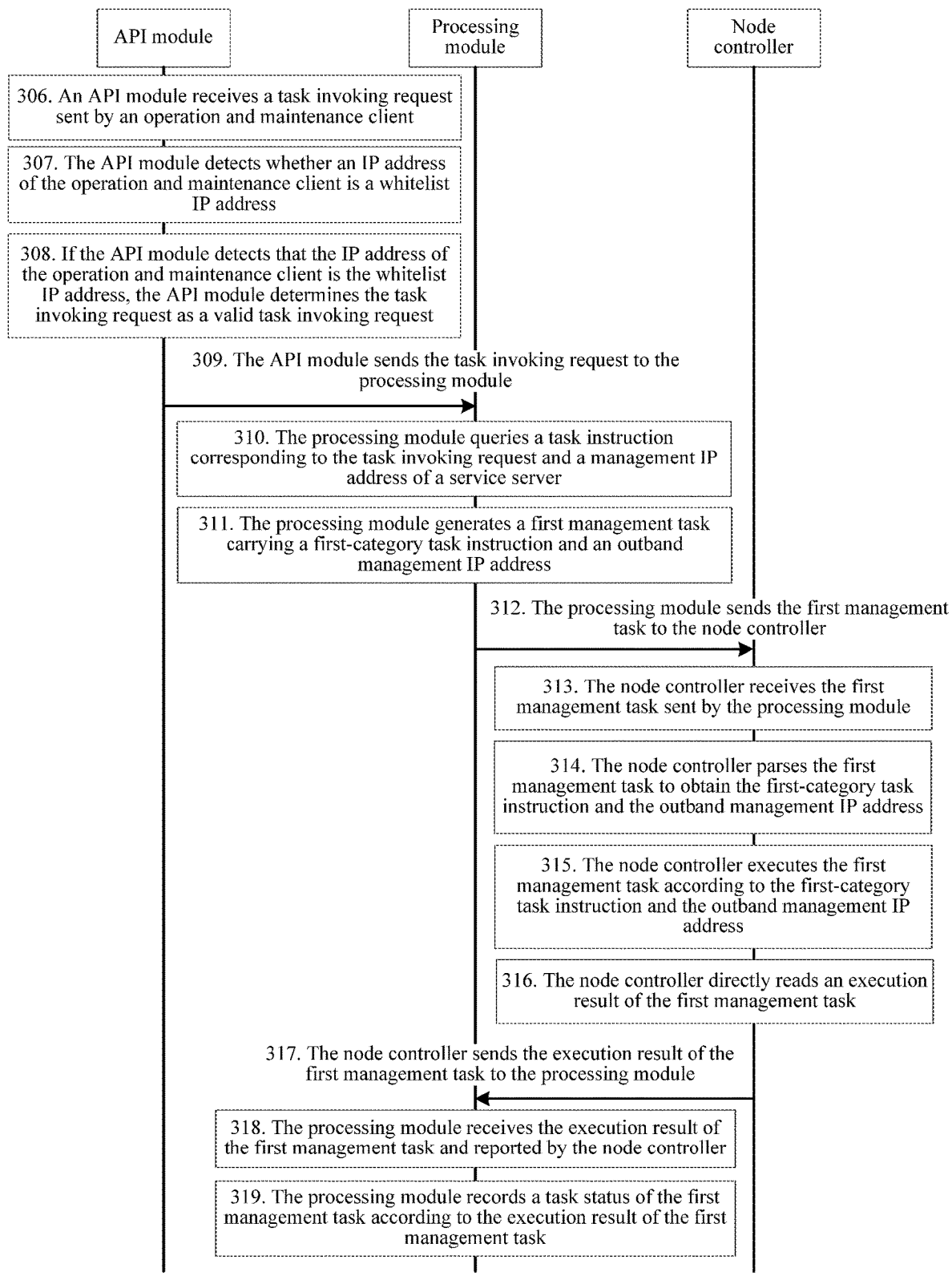
FIG. 3B is a method flowchart of a CDN management method according to still another example embodiment.

FIG. 3B is a method flowchart of a CDN management method according to still another example embodiment. The CDN management method is described by using an example in which the method is applied to the CDN management system 100 shown in FIG. 1A. As shown in FIG. 3B, the CDN management method includes the following steps.

Step 306. An API module receives a task invoking request sent by an operation and maintenance client.

A central controller may include the API module and a processing module. The API module may provide an API interface used for remote management.

The task invoking request may be sent by an operation and maintenance person to the API module by using the operation and maintenance client, or may be generated by the central controller by executing a script file.

Step 307. The API module detects whether an IP address of the operation and maintenance client is a whitelist IP address.

The whitelist IP address may be a pre-stored IP address of an operation and maintenance client having permission to operate the central controller. To detect whether the operation and maintenance client has permission to operate the central controller, it is detected whether the IP address of the operation and maintenance client is the whitelist IP address, to determine whether the central controller is to respond to the task invoking request sent by the operation and maintenance client.

Step 308. If the API module detects that the IP address of the operation and maintenance client is the whitelist IP address, the API module determines the task invoking request as a valid task invoking request.

When the IP address of the operation and maintenance client is the whitelist IP address, it indicates that the operation and maintenance client has the permission to operate the central controller, to determine the task invoking request sent by the operation and maintenance client as the valid task invoking request.

As another branch of step 307, when the API module detects that the IP address of the operation and maintenance client is not the whitelist IP address, the API module may determine the task invoking request as an invalid task invoking request, and the central controller does not respond to the task invoking request.

Step 309. The API module sends the task invoking request to the processing module.

The API module may parse a valid task invoking request and send the parsed task invoking request to the processing module of the central controller. If the task invoking request is an invalid task invoking request, the API module does not forward the task invoking request.

Step 310. The processing module queries a task instruction corresponding to the task invoking request and a management IP address of a service server.

The processing module may pre-store task instructions corresponding to various tasks invoking requests, for example, a power-on instruction corresponding to power-on, a shut-down instruction corresponding to shut-down, a restart instruction corresponding to restart, or an OS installation instruction, a codeword modification instruction, and a customization instruction that correspond to OS deployment.

The processing module of the central controller pre-stores an identifier of the service server, a corresponding management IP address, and an identifier of a corresponding node controller or a corresponding CDN node. Therefore, the processing module can find, according to the identifier of the service server obtained through parsing by the API module, the management IP address of the corresponding service server and the identifier of the CDN node or the node controller.

Step 311. The processing module generates a first management task carrying a first-category task instruction and an outband management IP address.

The first-category task instruction may include at least one of the power-on instruction, the shut-down instruction, the restart instruction, the instruction of entering the PXE, the PING detection instruction, and the SSH detection instruction. PING detection may be used to test whether a network is connected, and SSH detection may be used to test whether the service server can be logged on to. It should be noted that when generating the first management task, the processing module generates a task status corresponding to the first management task.

Step 312. The processing module sends the first management task to the node controller.

Step 313. The node controller receives the first management task sent by the processing module.

Step 314. The node controller parses the first management task to obtain the first-category task instruction and the outband management IP address.

Step 315. The node controller executes the first management task according to the first-category task instruction and the outband management IP address.

Step 316. The node controller directly reads an execution result of the first management task.

The node controller may execute the first management task by running a script or a tool, and after execution of the first management task is completed, the node controller may directly read the execution result of the script or the tool. The execution result may include a result indicating whether the first management task is successfully executed, and if the first management task is successfully executed, the execution result may further include output content obtained after the successful execution. For example, the output content may be content displayed after power-on.

Step 317. The node controller sends the execution result of the first management task to the processing module.

Step 318. The processing module receives the execution result of the first management task and reported by the node controller.

Step 319. The processing module records a task status of the first management task according to the execution result of the first management task.

In an implementation, corresponding to step 311, if the processing module stores an original task status of the first management task, the processing module may replace the original task status with successful execution when recording the task status of the first management task. For example, the central controller stores a service server whose sequence number is 00112233, and an original task status of a shut-down task of the service server is non-executed. Then, after executing the first management task, the node controller may shut down the service server whose sequence number is 00112233. Subsequently, the node controller may report an execution result of the first management task to the processing module of the central controller, and the processing module of the central controller may modify the task status of the service server whose sequence number is 00112233 to successful shut-down.

After the API module of the central controller receives the task invoking request of the first management task, the node controller is responsible for executing the first management task, and the processing module of the central controller is responsible for recording the task status of executing the first management task. After executing the first management task, the node controller may feed an execution result back to the processing module of the central controller, and the processing module of the central controller stores and records the execution result.

Figure 3C:
FIG. 3C is a method flowchart of a CDN management method according to still another example embodiment.

It should be noted that because an execution process of the first management task generally includes one step, the processing module of the central controller only records the task status of the first management task. FIG. 3C is a method flowchart of a CDN management method according to still another example embodiment. The CDN management method is described by using an example in which the method is applied to the CDN management system 100 shown in FIG. 1A. As shown in FIG. 3C, the CDN management method includes the following steps.

Step 320. An API module receives a task invoking request sent by an operation and maintenance client.

Step 321. The API module detects whether an IP address of the operation and maintenance client is a whitelist IP address.

Step 322. If the API module detects that the IP address of the operation and maintenance client is the whitelist IP address, the API module determines the task invoking request as a valid task invoking request.

Step 323. The API module sends the task invoking request to a processing module.

Step 324. The processing module queries a task instruction corresponding to the task invoking request and a management IP address of a service server.

Step 320 to step 324 are similar to step 306 to step 310, and details are not described herein again.

Step 325. The processing module generates a second management task carrying a second-category task instruction and a deployment management IP address.

The second-category task instruction may include at least one of an OS installation instruction, a codeword modification instruction of the OS, and an OS customization instruction.

When generating the second management task, the processing module may generate a task status corresponding to the second management task.

Step 326. The processing module sends the second management task to a node controller.

Step 327. The node controller receives the second management task sent by the processing module.

Step 328. The node controller parses the second management task to obtain the second-category task instruction and the deployment management IP address.

Step 329. The node controller executes the second management task according to the second-category task instruction and the deployment management IP address.

In a process of executing the second management task, if the node controller is to control a script file run by the service server corresponding to the deployment management IP address, the node controller may transmit the script file to the service server, and send an execution instruction of the script file to the service server, to control the service server corresponding to the deployment management IP address to run the script file.

Step 330. When the second-category task instruction is an OS installation instruction, the node controller sends a pre-stored image file and the installation instruction to the service server according to the deployment management IP address.

The image file may at least include at least one of an image file of a PXE, an image file of a mini OS, and an image file of a service system.

The node controller pre-stores the image file. In a process of executing the second management task, if the node controller requires the service server corresponding to the deployment management IP address in the second management task to install the image file, the node controller may send the pre-stored image file to the corresponding service server, and send an installation instruction of the image file to the service server, to control the service server to install the image file.

For example, in a process of executing the second management task, if the node controller requires the corresponding service server to install the PXE, the node controller may transmit the image file of the PXE to the corresponding service server, and send an installation instruction of the image file of the PXE, to control the corresponding service server to install the image file of the PXE. In a process of executing the second management task, if the node controller requires the corresponding service server to install the mini OS, the node controller may transmit the image file of the mini OS to the corresponding service server, and send an installation instruction of the image file of the mini OS, to control the corresponding service server to install the image file of the mini OS. In a process of executing the second management task, if the node controller requires the corresponding service server to install the image file of the service system, the node controller may transmit the image file of the service server to the corresponding service server, and send an installation instruction of the image file of the service system, to control the corresponding service server to install the image file of the service system.

Step 331. The service server installs the image file as an OS according to the installation instruction.

The installing, by the service server, the image file as the OS may include at least one of installing the image file of the PXE as the PXE, installing the image file of the mini OS as the mini OS, and installing the image file of the service system as the service system.

Step 332. When the second-category task instruction is a codeword modification instruction of the OS, the node controller sends a pre-stored first script file and the codeword modification instruction to the service server according to the deployment management IP address.

The first script file may be a script file used to modify a codeword, and the first script file may include a user name and a codeword of the instruction.

Because when entering the PXE, the service server uses a default user name and codeword sent by the central controller, the default user name and codeword are modified to ensure the security of the OS.

Step 333. The service server runs the first script file according to the codeword modification instruction.

The service server may modify the default user name and codeword into a designated user name and codeword by running the first script file.

Step 334. When the second-category task instruction is an OS customization instruction, the node controller sends a pre-stored second script file and the customization instruction to the service server according to the deployment management IP address.

The second script file may be a script file used to customize the OS, and the second script file may include an installation package of a predetermined application program. The customization of the OS may include installation of some predetermined application programs.

Step 335. The service server runs the second script file according to the customization instruction.

In an implementation, the service server may install a predetermined application program by running the second script file.

Step 336. The service server sends an execution result of the second-category task instruction to the node controller.

For the second-category task instruction, after executing the second-category task instruction, the service server may return the execution result of the second-category task instruction to the node controller.

The result of executing the second-category task instruction by the service server usually includes only an execution result of one step. For example, in step 331, after installing the OS, the service server may return, to the node controller, a result indicating that the OS is successfully installed. For another example, in step 333, after running the first script file, the service server may return, to the node controller, a result indicating that the first script file is successfully run. For another example, in step 335, after running the second script file, the service server may return, to the node controller, a result indicating that the second script file is successfully run.

Step 337. The node controller sends an execution result of the second management task to the processing module according to the execution result of the second-category task instruction.

Corresponding to step 336, the execution result of the second management task and sent by the node controller to the processing module of the central controller includes only an execution result of one step. For example, when the second management task includes the OS installation instruction, the execution result of the second management task may include a result indicating that the OS is successfully installed. For another example, when the second management task includes the codeword modification instruction of the OS, the execution result of the second management task may include a result indicating that the codeword of the OS is successfully modified. For another example, when the second management task includes the OS customization instruction, the execution result of the second management task may include a result indicating that OS is successfully customized.

Step 338. The processing module receives the execution result of the second management task and reported by the node controller.

Step 339. The processing module detects, according to the execution result of the second management task, whether deployment of the OS is completed.

Because the deployment of the OS usually includes multiple processes, each time after executing a second management task, the node controller may report an execution result of the second management task to the processing module of the central controller, and the processing module of the central controller determines whether to execute a next second management task.

In an actual application, when the execution result of the second management task is that the installation of the OS is completed or the codeword of the OS is successfully modified, it indicates that the deployment of the OS is not completed. When the execution result of the second management task is that the OS is successfully customized, it indicates that the deployment of the OS is completed.

Step 340. If the deployment of the OS is not completed, the processing module generates a next second management task according to the execution result of the second management task.

As a branch of step 339, if the processing module of the central controller detects that the deployment of the OS is completed, the processing module no longer sends the next second management task to the node controller.

In an implementation, corresponding to step 325, if the processing module originally stores a task status of the second management task, the processing module updates the original task status.

In a possible implementation, when the execution result of the second management task in step 339 is that the installation of the OS is completed, the processing module of the central controller may generate a next second management task carrying the codeword modification instruction of the OS and the outband management IP address. When the execution result of the second management task in step 339 is that the codeword of the OS is successfully modified, the processing module of the central controller may generate a next second management task carrying the OS customization instruction and the outband management IP address. When the execution result of the second management task in step 339 is that the OS is successfully customized, the processing module of the central controller no longer generates a next second management task.

In another possible implementation, when the execution result of the second management task in step 339 is that the installation of the OS is completed, the processing module of the central controller may generate a next second management task carrying the OS customization instruction and the outband management IP address. When the execution result of the second management task in step 339 is that the OS is successfully customized, the processing module of the central controller may generate a next second management task carrying the codeword modification instruction of the OS and the outband management IP address. When the execution result of the second management task in step 339 is that the codeword of the OS is successfully modified, the processing module of the central controller no longer generates a next second management task.

In another possible implementation, when the execution result of the second management task in step 339 is that the installation of the OS is completed, the processing module of the central controller may generate a next second management task carrying the codeword modification instruction of the OS and the outband management IP address. When the execution result of the second management task in step 339 is that the codeword of the OS is successfully modified, the processing module of the central controller no longer generates a next second management task.

It should be noted that this example embodiment does not limit a quantity of times of performing step 330, step 332, and step 334, and a sequence of the steps.

Step 341. The processing module sends the next second management task to the node controller.

Step 342. The node controller receives the next second management task sent by the processing module.

For execution of the next second management task, refer to step 328 to step 335.

It should be noted that step 336 to step 339 are performed after each of step 331, step 333, and step 335. In other words, in an OS deployment task, each time after a second management task is completed, an execution result is fed back to the processing module of the central controller, and the processing module of the central controller determines whether to execute the next second management task until the deployment of the OS is completed.

With reference to the CDN management methods provided in FIG. 3B and FIG. 3C, the deployment of the OS may include the following steps:

Step 1. Shut down the service server by using a first task instruction.

Step 2. Enable, by using the first task instruction, the service server to enter the PXE.

Step 3. Wait for the service server to enter the PXE.

Step 4. Perform RAID collection and modification by using a second task instruction.

Step 5. Install a mini OS by using the second task instruction.

Step 6. Install the OS based on the mini OS by using the second task instruction, where the installation includes configuration modification and the like.

Step 7. After the installation of the OS is completed, perform PING detection by using the first task instruction, perform SSH detection by using the first task instruction, and perform codeword modification by using the second task instruction.

Step 8. Execute a post-script by using the second task instruction, and complete customization configuration, where the customization configuration includes application program installation and the like.

In a process of deploying the OS, the node controller may periodically report a status and system information of the service server to the central controller. The status of the service server may include a status of entering a PXE, a status of installing the mini OS, a status of installing the service system, and the like. The system information may include data such as a network interface card and a memory of the service server.

Figure 3D:
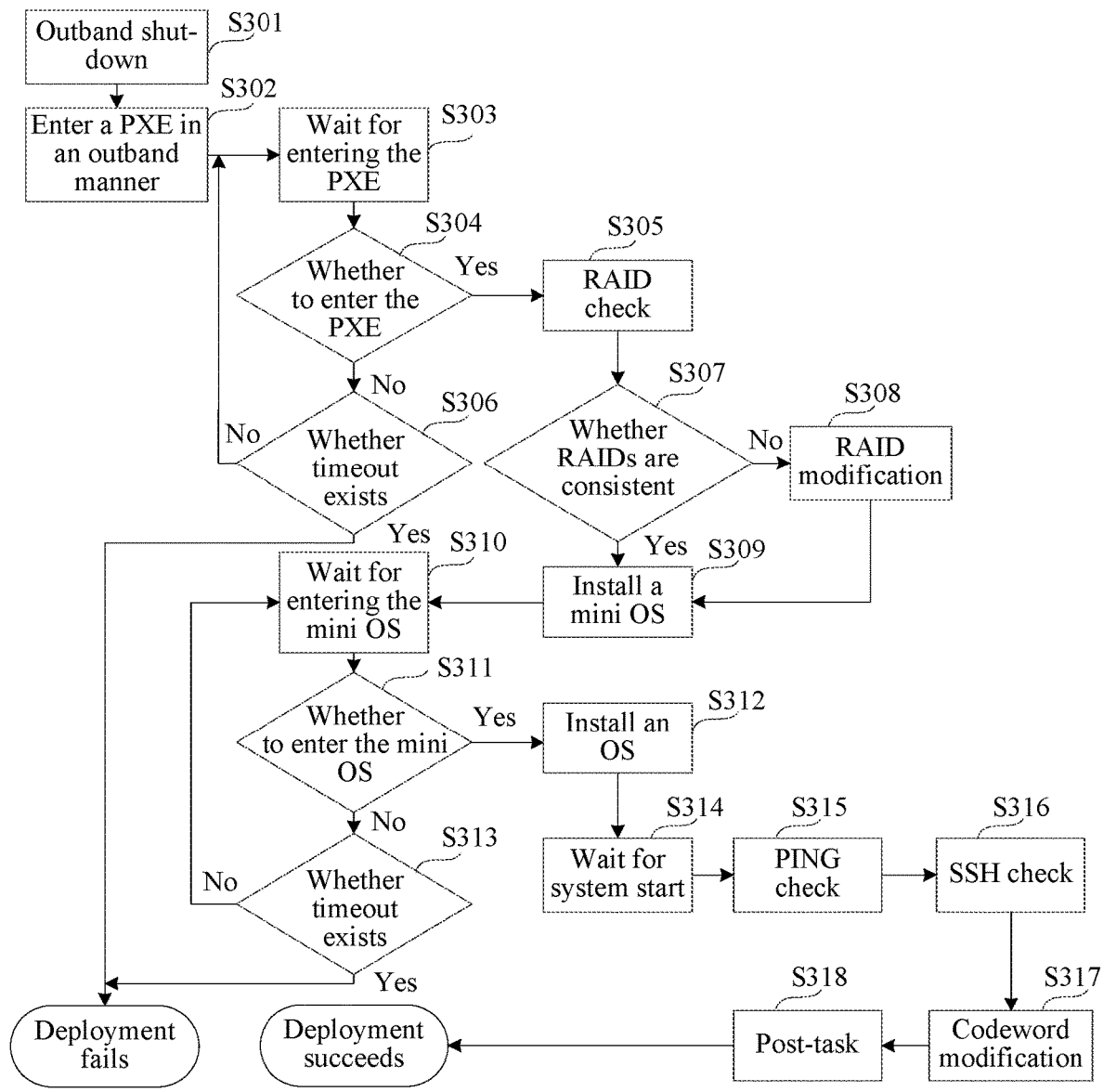
FIG. 3D is a principle diagram of OS deployment according to an example embodiment.

For example, FIG. 3D is a principle diagram of OS deployment. As shown in FIG. 3D, first, perform S301 of performing shut-down in an outband manner; perform S302 of entering the PXE in an outband manner; perform S303 of waiting for entering the PXE; perform S304 of determining whether to enter the PXE; if a determining result of S304 is yes, perform S305 of RAID check; perform S307 of determining whether RAIDs are consistent; if a determining result of S307 is no, perform S308 of RAID modification; perform S309 of installing the mini OS; if a determining result of S307 is yes, directly perform S309; after S309, perform S310 of waiting for entering the mini OS; perform S311 of determining whether to enter the mini OS; if a determining result of S311 is yes, perform S312 of installing the OS; perform S314 of waiting for starting of the system; perform S315 of PING check; perform S316 of SSH check; perform S317 of codeword modification; perform S318 of executing a post-task, and after the execution of the post-task is completely, the OS is successfully deployed. If an execution result if S304 is no, perform S306 of determining whether timeout exists; if a determining result of S306 is yes, the deployment of the OS fails; if the determining result of S306 is no, perform S303; if the determining result of S311 is no, perform S313 of determining whether timeout exists; if the determining result of S313 is yes, the deployment of the OS fails; if the determining result of S313 is no, perform S310.

Figure 3E:
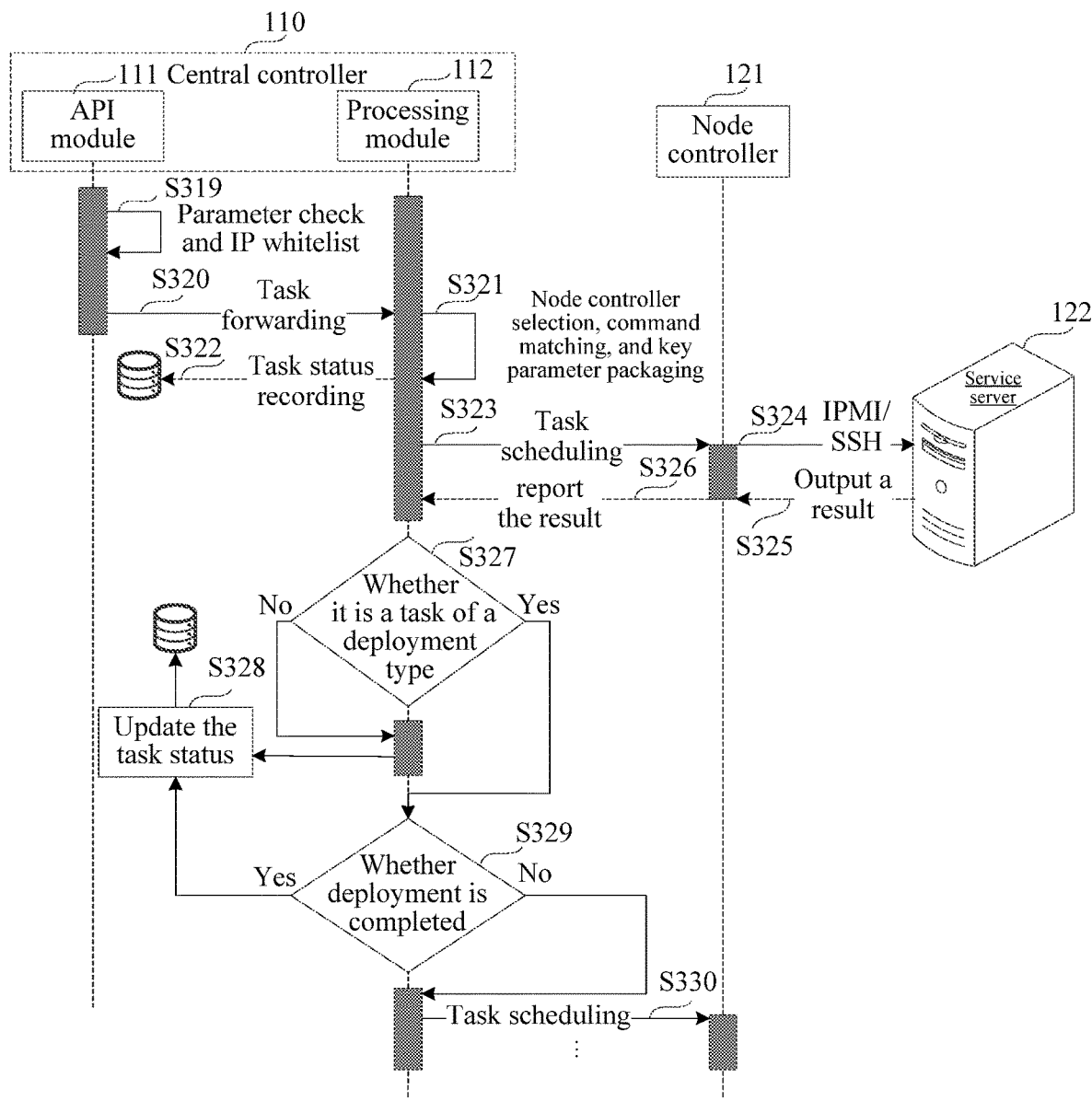
FIG. 3E is a principle diagram of a CDN management method according to an example embodiment.

The CDN management methods in FIG. 3B and FIG. 3C are exemplarily described in the principle diagram of the CDN management method shown in FIG. 3E. As shown in FIG. 3E, the API module 111 of the central controller 110 performs S319 of parameter check and IP whitelist detection; and if a detection result of S319 is an IP whitelist, performs S320 of task forwarding. The processing module 112 of the central controller 110 performs S321 of node controller selection, command matching, and key parameter packaging; the processing module 112 performs S323 of task scheduling, and the node controller 121 accepts the task scheduling of the processing module 112, and performs S324 of IPMI/SSH. The service server 122 performs S325 of outputting a result. The node controller 121 performs S326 of reporting the result to the processing module 112. The processing module 112 performs S322 of recording a task status. The processing module 112 performs S327 of determining whether it is a task of a deployment type; if a determining result of S327 is no, performs S328 of updating the task status; if the determining result of S327 is yes, performs S329 of determining whether the deployment is completed; if a determining result of S329 is yes, performs S328 of updating the task status; if the determining result of S329 is no, performs S330 of task scheduling. A process after S330 is the same as a process after S323.

In summary, in the CDN management method provided in this example embodiment, the central controller receives the task invoking request used to perform remote management on the service server of the CDN node, generates the management task according to the task invoking request, and sends the management task to the node controller. The node controller executes the management task. Because when a service server is managed, a central controller performs remote management on the service server by using a task invoking request, and the management does not need an on-site manual operation, the efficiency of managing many CDN nodes in disperse locations is improved.

In addition, the node controller assigns the management IP address to the service server, and sends the management IP address of the service server to the central controller for storage, so that when receiving the task invoking request, the central controller may send the management task to the corresponding node controller. In this way, when executing the management task, the node controller can send a script file and a script file execution instruction to the corresponding service server, to control the service server to execute the script file according to the execution instruction.

In addition, because different management tasks are generated for different task instructions, an outband management task may be transmitted by using an outband network, and a deployment management task may be transmitted by using a service network, so that congestion of the service network is avoided.

In addition, for the second management task, after the second management task is executed, the node controller may report the execution result to the central controller, and the central controller detects whether to send a next second management task, so that the central controller implements automatic OS deployment for the service server of the CDN node.

It is detected whether an IP address of an operation and maintenance client sending a task invoking request is a whitelist IP address, so that the CDN management system can effectively and securely perform remote management.

It should be supplementarily noted that because an image file or a script file is used during installation of the OS, and the node controller transmits the image file or the script file to a target service server when executing an OS deployment task, the node controller stores the image file or the script file. There are many CDN nodes, and as a result, efficiency of maintaining, by the CDN management system, the image file and the script file in the node controller is low. Therefore, the CDN management system may use a periodical synchronization mechanism for the node controller. For details, refer to descriptions of the following steps.

s1. The node controller sends a request to the central controller every a predetermined time interval, to request to detect whether the image file, the first script file, and the second script file are updated.

The image file is an image file that may be used to install the OS, the first script file may be an image file used to modify a codeword, and the second script file may be an image file used to customize the OS.

s2. When at least one of the image file, the first script file, and the second script file is updated, the node controller sends a request to the central controller to request to obtain at least one of the updated image file, first script file, and second script file.

s3. When receiving the request of the node controller for obtaining at least one of the updated image file, first script file, and second script file, the central controller sends at least one of the image file, the first script file, and the second script file to the node controller by using a CDN acceleration server.

Data packets of the image files and the script files are large, and the central controller and the node controller may use different operator networks. Therefore, when the central controller transmits the image file and the script file to the node controller, cross-operator network transmission is performed. In this way, the transmission speed is slow. To accelerate the transmission of the image file and the script file, the central controller may send the image file and the script file to the node controller by using the CDN acceleration server.

Figure 4:
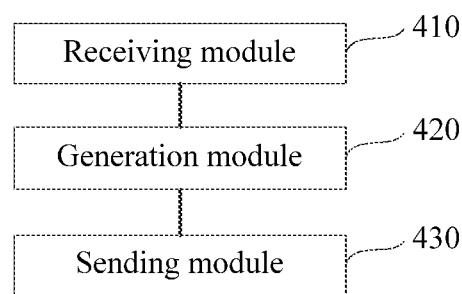
FIG. 4 is a structural block diagram of a CDN management apparatus according to an example embodiment.

FIG. 4 is a structural block diagram of a CDN management apparatus according to an example embodiment. The CDN management apparatus is described by using an example in which the apparatus is applied to the CDN management system 100 shown in FIG. 1A. As shown in FIG. 4, the CDN management apparatus includes a receiving module 410, a generation module 420, and a sending module 430.

The receiving module 410 is configured to implement step 201, step 305, step 309, step 318, step 323, step 338, and any other implied or disclosed functions related to receiving.

The generation module 420 is configured to implement step 202, step 340, and any other implied or disclosed functions related to generation.

The sending module 430 is configured to implement step 203, step 312, step 326, step 341, step s3, and any other implied or disclosed functions related to sending.

In an implementation, the generation module 420 includes a query unit and a generation unit.

The query unit is configured to implement step 310, step 324, and any other implied or disclosed functions related to querying.

The generation unit is configured to implement step 311, step 325, and any other implied or disclosed functions related to generation.

In an implementation, the CDN management apparatus further includes a recording module and a detection module.

The recording module is configured to implement step 319 and any other implied or disclosed functions related to generation.

The detection module is configured to implement step 339 and any other implied or disclosed functions related to detection.

In an implementation, the receiving module 410 includes a receiving unit, a detection unit, and a determining unit.

The receiving unit is configured to implement step 306, step 320, and any other implied or disclosed functions related to receiving.

The detection unit is configured to implement step 307, step 321, and any other implied or disclosed functions related to detection.

The determining unit is configured to implement step 308, step 322, and any other implied or disclosed functions related to determining.

In summary, in the CDN management apparatus provided in this example embodiment, the central controller receives the task invoking request used to perform remote management on the service server of the CDN node, generates the management task according to the task invoking request, and sends the management task to the node controller. The node controller controls, according to the management task, a target service server to execute the management task. Because when a service server is managed, remote management is performed on the service server by using a task invoking request, and the management does not need an on-site manual operation, the efficiency of managing many CDN nodes in disperse locations is improved.

It should be noted that during management of CDNs, the CDN management apparatus provided in this example embodiment is merely described by using division of functional modules as an example. In an actual application, the foregoing functions may be allocated to different functional modules for completion according to requirements. That is, the internal structure of the central controller is divided into different functional modules, to complete all or a part of functions described above. In addition, the CDN management apparatus provided in the foregoing example embodiments and the example embodiment of the CDN management method belong to a same concept. For a specific implementation process, refer to the method example embodiment, and details are not described herein again.

Figure 5:
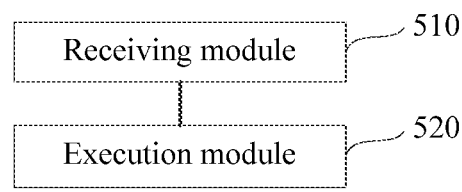
FIG. 5 is a structural block diagram of a CDN management apparatus according to another example embodiment.

FIG. 5 is a structural block diagram of a CDN management apparatus according to another example embodiment. The CDN management apparatus is described by using an example in which the apparatus is applied to the CDN management system 100 shown in FIG. 1A. As shown in FIG. 5, the CDN management apparatus includes a receiving module 510 and an execution module 520.

The receiving module 510 is configured to implement step 204, step 301, step 302, step 313, step 327, step 336, step 342, and any other implied or disclosed functions related to receiving.

The execution module 520 is configured to implement step 205 and any other implied or disclosed functions related to execution.

In an implementation, the CDN management apparatus further includes an assignment module, a sending module, a detection module, an obtaining module, and a reading module.

The assignment module is configured to implement step 303 and any other implied or disclosed functions related to assignment.

The sending module is configured to implement step 304, step 317, step 337, and any other implied or disclosed functions related to sending.

The detection module is configured to implement step s1 and any other implied or disclosed functions related to detection.

The obtaining module is configured to implement step s2 and any other implied or disclosed functions related to obtaining.

The reading module is configured to implement step 316 and any other implied or disclosed functions related to reading.

In an implementation, the assignment module includes a first assignment unit and a second assignment unit.

The first assignment unit is configured to implement step S1 and any other implied or disclosed functions related to assignment.

The second assignment unit is configured to implement step S2 and any other implied or disclosed functions related to assignment.

In an implementation, the control module includes a parsing unit and an execution unit.

The parsing unit is configured to implement step 314, step 328, and any other implied or disclosed functions related to parsing.

The execution unit is configured to implement step 315, step 329, step 330, step 331, step 332, step 333, step 334, step 335, and any other implied or disclosed functions related to receiving.

In summary, in the CDN management apparatus provided in this example embodiment, the central controller receives the task invoking request used to perform remote management on the service server of the CDN node, generates the management task according to the task invoking request, and sends the management task to the node controller. The node controller controls, according to the management task, a target service server to execute the management task. Because when a service server is managed, remote management is performed on the service server by using a task invoking request, and the management does not need an on-site manual operation, the efficiency of managing many CDN nodes in disperse locations is improved.

It should be noted that during management of CDNs, the CDN management apparatus provided in this example embodiment is merely described by using division of functional modules as an example. In an actual application, the foregoing functions may be allocated to different functional modules for completion according to requirements. That is, the internal structure of the node controller is divided into different functional modules, to complete all or a part of functions described above. In addition, the CDN management apparatus provided in the foregoing example embodiments and the example embodiment of the CDN management method belong to a same concept. For a specific implementation process, refer to the method example embodiment, and details are not described herein again.

An example embodiment further provides a CDN management system. The CDN management system includes a central controller and N CDN nodes, and N is a positive integer. Each CDN node includes a node controller, at least one service server, and a switch.

The central controller includes the CDN management apparatus shown in FIG. 4, and the node controller includes the CDN management apparatus shown in FIG. 5.

Figure 6:
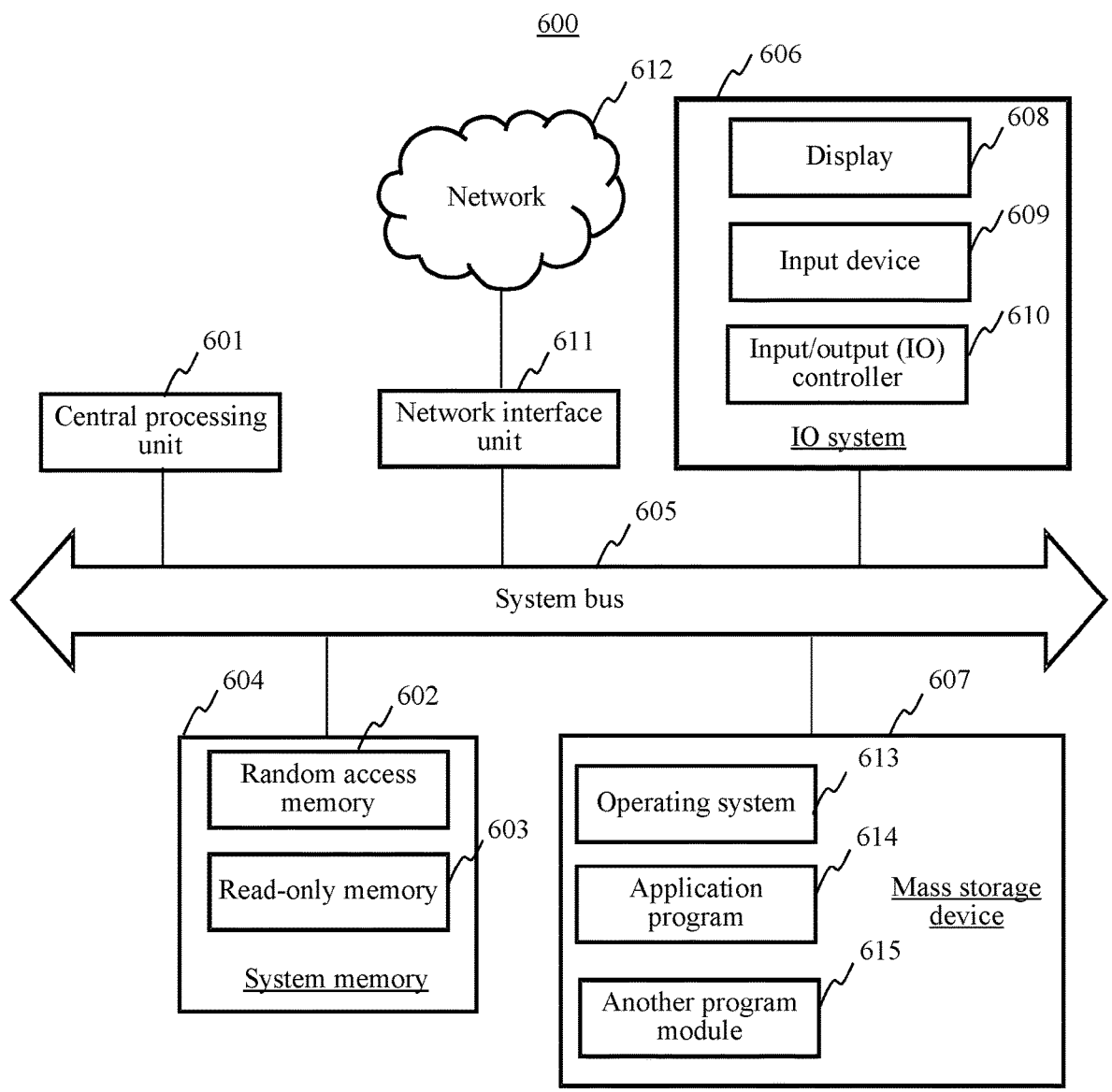
FIG. 6 is a schematic structural diagram of a server according to an example embodiment.

FIG. 6 is a schematic structural diagram of a server according to an example embodiment. The server may be the service server 122 shown in FIG. 1A, or the CDN acceleration server 150. Specifically, the server 600 includes processor, namely, a central processing unit (CPU) 601, a system memory 602 including a random access memory (RAM) 603 and a read-only memory (ROM) 604, and a system bus 605 connecting the system memory 604 and the CPU 601. The server 600 further includes a basic input/output system (I/O system) 606 used for transmitting information between components in a computer, and a mass storage device 607 configured to store an OS 613, an application program 614, and another program module 615.

The basic I/O system 606 includes a display 608 configured to display information, and an input device 609, such as a mouse and a keyboard, used for a user to input information. The display 608 and the input device 609 are connected to an IO controller 610 of the system bus 605, to be connected to the CPU 601. The basic I/O system 606 may further include the input/output controller 610, to receive and process input of multiple other devices, such as the keyboard, the mouse, or an electronic stylus. Similarly, the input/output controller 610 further provides an output to a display, a printer, or another type of output device.

The mass storage device 607 is connected to a mass storage controller (not shown) of the system bus 605, to be connected to the CPU 601. The mass storage device 607 and an associated computer readable medium provide non-volatile storage for the server 600. That is, the mass storage device 607 may include a computer readable medium, such as a hard disk or a CD-ROM drive.

The computer readable medium may include a computer storage medium and a communication medium. The computer storage medium includes volatile and non-volatile, and removable and non-removable mediums implemented by using any method or technology used for storing information such as a computer readable instruction, a data structure, a program module, or other data. The computer storage medium includes a RAM, a ROM, an EPROM, an EEPROM, a flash memory or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing. The system memory 604 and the mass storage device 607 may be generally referred to as a memory. The CPU 601 may perform any implementation of the CDN management method in the foregoing example embodiments according to an instruction stored in the memory.

According to various example embodiments, the server 600 may further be connected, through a network such as Internet, a remote computer on the network for running. In other words, the server 600 may be connected to a network 605 by being connected to a network interface unit 611 on the system bus 612, or may be connected to a network of another type or a remote computer system by using a network interface unit 611.

An example embodiment further provides a computer readable storage medium. The computer readable storage medium may be a computer readable storage medium included in the memory in the foregoing example embodiment, or may exist independently, and is not assembled into a computer readable storage medium in a terminal. The computer readable storage medium stores one or more programs, and one or more processors execute the one or more programs to perform the CDN management method.

An example embodiment further provides a computer program product including an instruction. When the computer program product runs on a computer, the computer performs any implementation of the CDN management method in the foregoing example embodiments.

The sequence numbers of the example embodiments are merely used for description, but do not represent advantages and disadvantages of the example embodiments.

All or some of the steps of the foregoing example embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely example embodiments, but are not used to limit this application. Any modification, equivalent replacement, improvement, or the like made within the spirit and scope of this application shall fall within the protection scope of this application.

What is claimed is:

1. A system comprising:
   a central controller; and
   at least one content delivery network (CDN) node,
   wherein each of the at least one CDN node comprises at least one memory configured to store computer code and at least one processor configured to access the at least one memory and operate according to the computer code, the computer code including:
      node controller code configured to cause the at least one processor to implement a node controller connected to the central controller,
      service server code configured to cause the at least one processor to implement at least one service server, and
      switch code configured to cause the at least one processor to implement a switch connected to the node controller and each service server,
   wherein the central controller is configured to receive a task invoking request, generate a management task according to the task invoking request, and send the management task to the node controller, the task invoking request indicating a request to perform remote management on one service server of the at least one service server of the CDN node, and
   wherein the node controller code is further configured cause the at least one processor to receive the management task sent by the central controller, identify, based on a category of the management task, a management Internet Protocol (IP) address of the service server that comprises any one or any combination of an outband management IP address and a deployment management IP address, wherein the management IP address is different from an IP address of the service server used to provide a service, assign the management IP address to the service server, and control the service server based on the management task.

2. The system according to claim 1, wherein the node controller code is further configured to cause the at least one processor to assign the management IP address to the service server according to a dynamic host configuration protocol (DHCP) request sent by the service server, and send the management IP address of the service server to the central controller, wherein the central controller is further configured to receive and store the management IP address of the service server; and wherein the central controller is further configured to: when receiving the task invoking request, query a task instruction corresponding to the task invoking request and the management IP address of the service server, and generate the management task carrying the task instruction and the management IP address.

3. One or more non-transitory storage mediums storing computer readable instructions, the computer readable instructions, when executed by one or more processors of a central controller, cause the one or more processors to:

receive, by the one or more processors of the central controller, a task invoking request indicating a request to perform remote management on a service server of a content delivery network (CDN) node that includes a node controller and at least one service server;

receive, by the one or more processors of the central controller, a management Internet Protocol (IP) address of the service server reported by the node controller, the management IP address comprising an outband management IP address and a deployment management IP address, wherein the management IP address is different from an IP address of the service server used to provide a service;

generate, by the one or more processors of the central controller, a management task according to the task invoking request, wherein when a task instruction corresponding to the task invoking request is a first-category task instruction, the management task comprises a first management task carrying the first-category task instruction and the outband management IP address; and when the task instruction is a second-category task instruction, the management task comprises a second management task carrying the second-category task instruction and the deployment management IP address; and send, by the one or more processors of the central controller, the management task to the node controller.

4. The one or more non-transitory storage mediums according to claim 3, wherein the computer readable instructions further cause the one or more processors to:

receive, before the receiving the task invoking request, the management IP address of the service server reported by the node controller, the management IP address being assigned by the node controller to the service server after the node controller receives a dynamic host configuration protocol (DHCP) request sent by the service server, and wherein the generating the management task according to the task invoking request comprises:
querying the task instruction and the management IP address of the service server; and
generating the management task carrying the task instruction and the management IP address.

5. The one or more non-transitory storage mediums according to claim 4, wherein the first-category task instruction comprises at least one from among a power-on instruction, a shutdown instruction, a restart instruction, an instruction of entering a preboot execute environment (PXE), a packet Internet groper (PING) detection instruction, and a secure shell (SSH) detection instruction, and wherein the second-category task instruction comprises at least one from among an installation instruction of the OS, a codeword modification instruction of the OS, and a customization instruction of the OS.

6. The one or more non-transitory storage mediums according to claim 5, wherein the computer readable instructions further cause the one or more processors to:

receive, after the sending the management task to the node controller, an execution result of the first management task and reported by the node controller; and record a task status of the first management task according to the execution result of the first management task.

7. The one or more non-transitory storage mediums according to claim 5, wherein the computer readable instructions further cause the one or more processors to:

receive, after the sending the management task to the node controller, an execution result of the second management task and reported by the node controller;

detect, according to the execution result of the second management task, whether deployment of the OS is completed;

generate a next second management task according to the execution result of the second management task based on the deployment of the OS not being completed; and send the next second management task to the node controller.

8. The one or more non-transitory storage mediums according to claim 5, wherein the receiving the task invoking request comprises:

receiving, using an application programming interface (API) interface, the task invoking request sent by an operation and maintenance client;

detecting whether an IP address of the operation and maintenance client is a whitelist IP address; and identifying the task invoking request as a valid task invoking request based on the IP address of the operation and maintenance client being the whitelist IP address.

9. The one or more non-transitory storage mediums according to claim 5, wherein the computer readable instructions further cause the one or more processors to:

periodically send at least one from among an image file, a first script file, and a second script file to the node controller every predetermined time interval by using a CDN acceleration server, and wherein the image file is used to install the OS, the first script file is used to modify a codeword, and the second script file is used to customize the OS.

10. A method performed by a content delivery network (CDN) node comprising a node controller and at least one service server, the method comprising:

receiving, by one or more processors of the node controller, a management task sent by a central controller, the management task being generated by the central controller according to a task invoking request, and the task invoking request indicating a request to perform remote management on the service server of the CDN node;

identifying, by the one or more processors of the node controller, based on a category of the management task, a management Internet Protocol (IP) address of the service server that comprises any one or any combination of an outband management IP address and a deployment management IP address, wherein the management IP address is different from an IP address of the service server used to provide a service;

assigning, by the one or more processors of the node controller, the management IP address to the service server; and executing, by the one or more processors of the node controller, the management task using the management IP address.

11. The method according to claim 10, wherein the method further comprises:

receiving, before the receiving the management task sent by the central controller, a dynamic host configuration protocol (DHCP) request sent by the service server;

assigning the management IP address to the service server according to the DHCP request; and sending the management IP address of the service server to the central controller.

12. The method according to claim 11, wherein assigning the management IP address to the service server according to the DHCP request comprises:

assigning the outband management IP address to the service server, the deployment management IP address being assigned from a first IP network segment corresponding to a first virtual local area network (VLAN); and assigning the deployment management IP address to the service server, the deployment management IP address being assigned from a second IP network segment corresponding to a second VLAN, wherein the outband management IP address is used to execute a first-category task instruction, wherein the deployment management IP address is used to execute a second-category task instruction, wherein the first-category task instruction comprises at least one from among a power-on instruction, a shutdown instruction, a restart instruction, an instruction of entering a preboot execute environment (PXE), a packet Internet groper (PING) detection instruction, and a secure shell (SSH) detection instruction, and wherein the second-category task instruction comprises at least one from among an installation instruction of the OS, a codeword modification instruction of the OS, and a customization instruction of the OS.

13. The method according to claim 12, wherein the management task comprises a first management task carrying the first-category task instruction and the outband management IP address; and wherein the executing the management task comprises:
parsing the first management task to identify the first-category task instruction and the outband management IP address; and
executing the first management task according to the first-category task instruction and the outband management IP address.

14. The method according to claim 13, wherein the method further comprises:

directly reading an execution result of the first management task; and sending the execution result of the first management task to the central controller.

15. The method according to claim 12, wherein the management task comprises a second management task carrying the second-category task instruction and the deployment management IP address; and wherein the executing the management task comprises:
parsing the second management task to identify the second-category task instruction and the deployment management IP address; and
executing the second management task according to the second-category task instruction and the deployment management IP address.

16. The method according to claim 15, wherein the executing the management task further comprises, based on the second-category task instruction being the installation instruction of the OS, sending a pre-stored image file and the installation instruction to the service server according to the deployment management IP address.

17. The method according to claim 15, wherein the executing the management task further comprises, based on the second-category task instruction being the codeword modification instruction of the OS, sending a pre-stored first script file and the codeword modification instruction to the service server according to the deployment management IP address, wherein the first script file is used to modify a codeword.

18. The method according to claim 15, wherein the executing the management task further comprises, based on the second-category task instruction being the customization instruction of the OS, sending a pre-stored second script file and the customization instruction to the service server according to the deployment management IP address, wherein the second script file is used to customize the OS.

19. The method according to claim 15, wherein the method further comprises:

receiving an execution result of the second-category task instruction sent by the service server;

sending an execution result of the second management task to the central controller according to the execution result of the second-category task instruction; and receiving a next second management task sent by the central controller, wherein the next second management task is generated and sent by the central controller according to the execution result based on the central controller detecting, according to the execution result, that deployment of the OS is not completed.

20. The method according to claim 15, wherein the method further comprises:

periodically sending a request to the central controller every predetermined time interval, to detect whether the image file, the first script file, and the second script file are updated; and based on at least one of the image file, the first script file, and the second script file being updated, sending a request to the central controller to request to obtain at least one of the updated image file, first script file, and second script file, and wherein the image file is used to install the OS, the first script file is used to modify a codeword, and the second script file is used to customize the OS.

* * * * *